United States Patent
Lee et al.

(10) Patent No.: US 9,832,743 B2
(45) Date of Patent: Nov. 28, 2017

(54) METHOD FOR CONTROLLING UPLINK TRANSMISSIONS OF A USER EQUIPMENT (UE) IN A MULTI-RADIO ACCESS TECHNOLOGY (RAT) ENVIRONMENT AND APPARATUS THEREFOR

(71) Applicant: LG ELECTRONICS INC., Seoul (KR)

(72) Inventors: Eunjong Lee, Seoul (KR); Jaehoon Chung, Seoul (KR); Hyeyoung Choi, Seoul (KR); Heejeong Cho, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 65 days.

(21) Appl. No.: 14/896,564

(22) PCT Filed: Jul. 8, 2014

(86) PCT No.: PCT/KR2014/006093
§ 371 (c)(1),
(2) Date: Dec. 7, 2015

(87) PCT Pub. No.: WO2015/005633
PCT Pub. Date: Jan. 15, 2015

(65) Prior Publication Data
US 2016/0128004 A1     May 5, 2016

Related U.S. Application Data

(60) Provisional application No. 61/843,457, filed on Jul. 8, 2013, provisional application No. 61/857,689, filed on Jul. 23, 2013.

(51) Int. Cl.
*G08C 17/00* (2006.01)
*H04W 52/38* (2009.01)
(Continued)

(52) U.S. Cl.
CPC ......... *H04W 52/38* (2013.01); *H04W 52/146* (2013.01); *H04W 52/365* (2013.01);
(Continued)

(58) Field of Classification Search
CPC . H04W 52/38; H04W 52/146; H04W 52/365; H04W 52/367; H04W 72/1284; H04W 88/06; H04W 84/042; H04W 84/12
(Continued)

(56) References Cited

U.S. PATENT DOCUMENTS 9,413,395 B2 * 8/2016 Love .................... H04B 1/0064
2011/0158117 A1   6/2011 Ho et al.
(Continued)

*Primary Examiner* — Faisal Choudhury
(74) *Attorney, Agent, or Firm* — Birch, Stewart, Kolasch & Birch, LLP

(57) ABSTRACT

An uplink control method includes reporting information on user equipment (UE) transmit power for a first RAT and a second RAT upon transmission of uplink data to an entity of the first RAT, receiving a message including information for deactivating an uplink of one of the first and the second RATs from the entity of the first RAT, when a sum of the UE transmit powers of the uplink data for the first RAT and the second RAT exceeds first maximum transmit power, and selectively deactivating the uplink of the one of the first and the second RATs based on the message from an entity of the first RAT.

13 Claims, 14 Drawing Sheets

(51) Int. Cl.
*H04W 52/14* (2009.01)
*H04W 52/36* (2009.01)
*H04W 72/12* (2009.01)
*H04W 84/04* (2009.01)
*H04W 84/12* (2009.01)
*H04W 88/06* (2009.01)

(52) U.S. Cl.
CPC ..... *H04W 52/367* (2013.01); *H04W 72/1284* (2013.01); *H04W 72/1215* (2013.01); *H04W 84/042* (2013.01); *H04W 84/12* (2013.01); *H04W 88/06* (2013.01)

(58) Field of Classification Search
USPC .......................................................... 370/311
See application file for complete search history.

(56) References Cited

U.S. PATENT DOCUMENTS

| | | | |
|---|---|---|---|
| 2011/0237289 A1 | 9/2011 | Fodor et al. | |
| 2012/0082046 A1* | 4/2012 | Ho | H04W 52/367 370/252 |
| 2012/0083264 A1* | 4/2012 | Ramasamy | H04W 52/262 455/425 |
| 2012/0236735 A1 | 9/2012 | Nory et al. | |
| 2013/0051261 A1* | 2/2013 | Kazmi | H04B 7/0693 370/252 |
| 2013/0065525 A1* | 3/2013 | Kiukkonen | H04W 52/36 455/41.2 |
| 2013/0143580 A1 | 6/2013 | Michel | |
| 2013/0324107 A1* | 12/2013 | Lindoff | H04W 24/10 455/422.1 |

\* cited by examiner

FIG. 1C

| | Element | Element ID | Length of indicated element (in octets) | Extensible |
|---|---|---|---|---|
| | SSID | 0 | 2 to 34 | |
| b-2-1) | Power Constraint | 32 | 3 | |
| b-2-2) | Power Capability | 33 | 4 | |
| | TPC Request | 34 | 2 | |
| | TPC Report | 35 | 4 | |
| | Supported Channels | 36 | 4 to 256 | |
| | Channel Switch Announcement | 37 | 5 | |
| | Measurement Request | 38 | 5 to 257 | Subelements, for formats using 8.4.2.23.4 to 8.4.2.23.12. |
| | Measurement Report | 39 | 5 to 257 | Subelements, for formats using 8.4.2.24.4 to 8.4.2.24.11. |
| | Quiet | 40 | 8 | |
| | IBSS DFS | 41 | 10 to 255 | |
| | AP Channel Report | 51 | 3 to 257 | |
| | Neighbor Report | 52 | 15 to 257 | Subelements |
| | Extended Channel Switch Announcement | 60 | 6 | |
| | Channel Switch Timing | 104 | 6 | Yes | b-2)

FIG. 1D

| Element ID | Length | Information |
|---|---|---|
| 1 | 1 | variable |

Octets:

(a)

| Element ID | Length | Local Power Constraint |
|---|---|---|
| 1 | 1 | 1 |

Octets:

(b)

| Element ID | Length | Minimum Transmit Power Capability | Maximum Transmit Power Capability |
|---|---|---|---|
| 1 | 1 | 1 | 1 |

Octets:

(c)

Center UE        Edge UE (a) Uplink Interference Environment (b) Open-loop PC with closed-loop correction Full power compensation vs Fractional power compensation ——— Equal received SNR Power Control (Conventional Scheme)
- - - - - - UE path loss-dependent Power Control

METHOD FOR CONTROLLING UPLINK TRANSMISSIONS OF A USER EQUIPMENT (UE) IN A MULTI-RADIO ACCESS TECHNOLOGY (RAT) ENVIRONMENT AND APPARATUS THEREFOR

CROSS REFERENCE TO RELATED APPLICATIONS

This application is the National Phase of PCT International Application No. PCT/KR2014/006093, filed on Jul. 8, 2014, which claims priority under 35 U.S.C. 119(e) to U.S. Provisional Application No. 61/843,457, filed on Jul. 8, 2013 and 61/857,689 filed on Jul. 23, 2013, all of which are hereby expressly incorporated by reference into the present application.

TECHNICAL FIELD

The present invention relates to wireless communication, and, more particularly, to a method for scheduling uplinks of radio access technologies (RATs) in an environment in which at least two RATs are deployed, and an apparatus therefor.

BACKGROUND ART

Multi-RAT in which heterogeneous communication networks are merged has been researched. For example, a multi-RAT user equipment (UE) supports both a cellular network and a wireless local area network (WLAN). Such a multi-RAT UE can selectively access any one of a plurality of RATs but cannot simultaneously access the plurality of RATs. That is, even when a UE has multi-RAT capabilities, the UE cannot simultaneously transmit and receive data via different RATs.

If a UE transmits data, transmit power used by the UE is restricted to a predetermined range. The transmit power of the UE may be restricted for various reasons. For example, maximum transmit power of a UE may be restricted in order to reduce interference with another UE, to more efficiently use power of the UE or to reduce influence of a radio frequency (RF) signal transmitted by the UE on a human body.

In the related art, when a multi-RAT UE accesses one of the first and the second RATs, transmit power of the UE is restricted according to the policy of the RAT. However, the related art does not consider transmit power of a UE and data transmission and reception scheduling of the UE when a multi-RAT UE simultaneously accesses a plurality of RATs.

DISCLOSURE

Technical Problem

An object of the present invention devised to solve the problem lies in a method for controlling uplink transmissions for a first RAT and a second RAT or scheduling uplink transmissions in consideration of transmit power of a user equipment (UE) for transmitting uplink data to the first RAT and the second RAT in a multi-RAT environment, and an apparatus for performing the method.

Another object of the present invention devised to solve the problem lies in a method for dynamically scheduling uplinks for a first RAT and a second RAT according to conditions such as transmit power of a UE for the first RAT or the second RAT, data load or UE procedures in a multi-RAT environment, and an apparatus for performing the method.

The technical problems solved by the present invention are not limited to the above technical problems and other technical problems which are not described herein will become apparent to those skilled in the art from the following description.

Technical Solution

The object of the present invention can be achieved by providing a method for controlling uplink transmissions at a user equipment (UE) in a multi-radio access technology (multi-RAT) environment including transmitting uplink data for a first RAT and a second RAT to a base station of the first RAT and a base station of the second RAT; reporting information on UE transmit power for the first RAT and the second RAT according to the transmission of the uplink data, to an entity of the first RAT managing interworking between the first RAT and the second RAT; receiving a message including information for deactivating an uplink of one of the first and second RATs from the entity of the first RAT, when a sum of the UE transmit power for the first RAT and the UE transmit power for the second RAT exceeds first maximum transmit power; and selectively deactivating the uplink of the one of the first and second RATs based on the message from the entity of the first RAT.

In another aspect of the present invention, provided herein is a method for controlling an uplink of a UE at an entity managing interworking between multiple radio access technologies (RATs) including receiving information on UE transmit power related to transmission of uplink data to a first RAT and a second RAT; and transmitting a message including information for deactivating an uplink of one of the first and the second RATs, when a sum of the UE transmit power for the first RAT and the UE transmit power for the second RAT exceeds first maximum transmit power, wherein the uplink of the one of the first and the second RATs is selectively deactivated based on the message.

In a further aspect of the present invention, provided herein is a method for controlling uplinks at a user equipment (UE) in a multi-radio access technology (RAT) environment including receiving a message including a condition for deactivating an uplink of a first RAT or an uplink of a second RAT from an entity of the first RAT managing interworking between the first RAT and the second RAT; determining whether uplink data for the first RAT and uplink data for the second RAT can be simultaneously transmitted, based on the message; deactivating an uplink of one of the first and the second RATs if the uplink data for the first and the second RATs cannot be simultaneously transmitted; and switching a flow of the uplink data which has been transmitted via the RAT, the uplink of which is deactivated, is switched to another RAT.

Advantageous Effects

According to one embodiment of the present invention, since uplink transmissions are scheduled in consideration of maximum transmit power of a UE for multi-RAT, even when the UE can simultaneously access two different RATs to simultaneously transmit data, it is possible to solve a problem that actual transmit power of the UE exceeds the maximum transmit power of the UE. Since uplinks are controlled according to data load of a specific RAT, it is possible to solve a bottleneck phenomenon and buffer overflow generated in a node of a specific RAT due to resource contention between uplink and downlink.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

In the drawings:

FIG. 1c is a diagram showing IDs of information elements of IEEE 802.11;

FIG. 1d is a diagram showing general formats of information elements, a format of a power constraint element and a format of a power capability element of IEEE 802.11;

BEST MODE

Figure 1A:
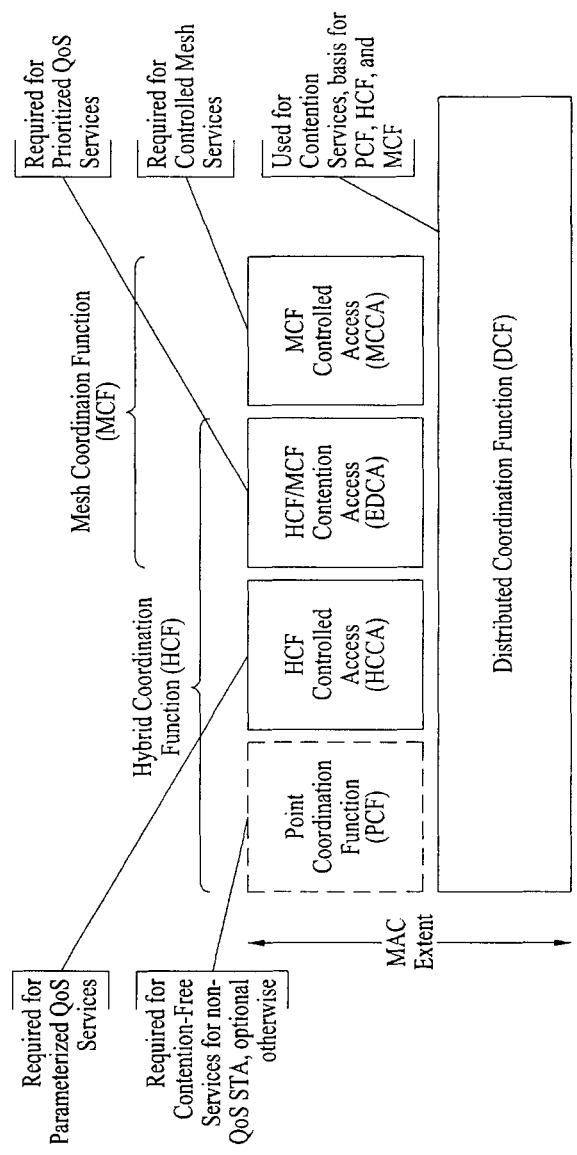
FIG. 1a is a diagram showing MAC architecture of IEEE 802.11.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, a first RAT is a cellular system or a cellular network. For example, assume that the first RAT is a 3GPP LTE or LTE-A system. However, the first RAT may be implemented by another arbitrary cellular system except for unique items of the 3GPP LTE or LTE-A system. A second RAT is a wireless communication system or a wireless communication network using a wireless communication method different from that of the first RAT and may be a data transmission system having coverage relatively smaller than that of the first RAT. For example, the second RAT may be a wireless local area network (WLAN) system such as WLAN or Wi-Fi, but is not limited thereto.

In the following description, assume that a terminal is a generic term for a mobile or fixed user-end device such as a user equipment (UE), a mobile station (MS), an advanced mobile station (AMS), a station (STA) and the like. In addition, assume that a base station is a generic name for any node, which communicates with a terminal in a first RAT or a second RAT, such as a Node B, an eNode B, a base station, an access point (AP) and the like. Although a 3GPP LTE/LTE-A, an IEEE 802.16 or an IEEE 802.11 system is focused upon in the present specification, the present invention is applicable to various different communication systems. In the following description, a base station of a second RAT is a generic name for any node, which communicates with a terminal in a second RAT, such as an AP.

In the first RAT, a UE may receive information from a base station in downlink and transmit information in uplink. Information transmitted or received by the UE includes data and a variety of control information and physical channels differ according to type and usage of information transmitted or received by the UE.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied with radio technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of the E-UMTS (Evolved UMTS), which uses E-UTRA. 3GPP LTE employs OFDMA in downlink and employs the SC-FDMA in uplink. LTE-Advanced (LTE-A) is an evolved version of the 3GPP LTE.

It should be noted that specific terms disclosed in the present invention are proposed for convenience of description and better understanding of the present invention, and the use of these specific terms may be changed to another format within the technical scope or spirit of the present invention.

MODE FOR INVENTION

1. IEEE 802.11

1-1. IEEE 802.11 MAC Architecture

FIG. 1a is a diagram showing media access control (MAC) architecture of IEEE 802.11. According to the MAC architecture of 802.11, in a WLAN, a distributed coordination function (DCF), a point coordination Function (PCF) and a hybrid coordination function (HCF) are representatively used to occupy resource.

The distributed coordination function (DCF) will now be described. The fundamental access method of the IEEE 802.11 MAC is a Distributed Coordination Function (DCF) known as Carrier Sense Multiple Access with Collision Avoidance (CSMA/CA). The DCF shall be implemented in all stations (STAs).

A point coordination function (PCF) will now be described. The IEEE 802.11 MAC may also incorporate an optional access method called a Point Coordination Function (PCF), which is only usable on infrastructure network configurations. This access method uses a PC, which shall operate at the Access Point (AP) of the Basic Service Set (BSS), to determine which STA currently has the right to transmit.

A hybrid coordination function (HCF) will now be described. The QoS facility includes an additional coordination function called HCF that is only usable in QoS network configurations. The HCF shall be implemented in all QoS STAs except mesh STAs.

In the WLAN, the DCF is generally used. However, in a CSMA/CA based DCF, unfairness of downlink/uplink (DL/UL) is problematic. In the CSMA/CA based DCF which is used in the WLAN, all UEs as well as APs have the same opportunity for media access. That is, DL data transmitted by the AP and UL data transmitted by the UE equally contend for resource occupation using a method for assigning data transmission resources to the UE or AP which first occupies resources based on contention. Unlike a cellular network in which an eNB is managing DL/UL resource assignment scheduling, the AP is regarded as a UE which will occupy resources.

However, even in a WLAN system, similarly to a cellular system, since all DL data is transmitted to a UE via an AP, the amount of data to be transmitted by the AP is greater than the amount of UL data of the UE. If the number of UEs having UL data is n, the AP equally contends with the n+1 UEs for resource occupation.

Accordingly, in a DCF based resource occupation technology, as the number of WLAN UEs is increased, a buffer overflow problem may be likely to occur due to a bottleneck phenomenon of an AP, and DL data transmission efficiency may deteriorate.

1-2. IEEE 802.11 MAC Frame Format

Figure 1B:
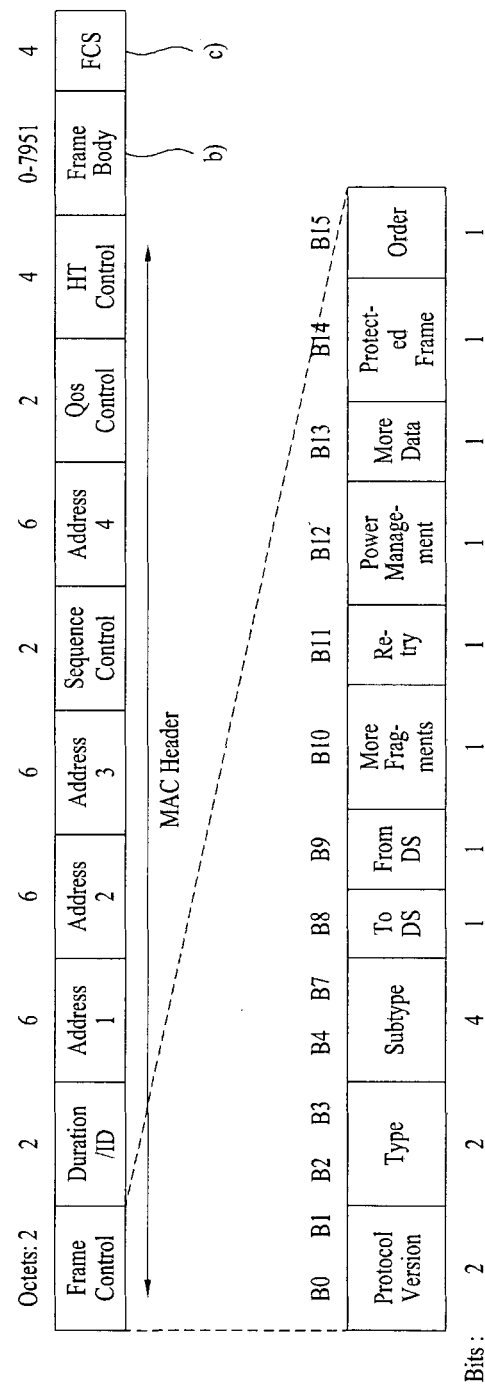
FIG. 1b is a diagram showing a MAC frame format and a frame control field of IEEE 802.11.

FIG. 1b is a diagram showing a MAC frame format of IEEE 802.11.

In the MAC frame format, basic components will be described. Each frame consists of the following basic components:

a) A MAC header, which comprises frame control, duration, address, optional sequence control information, optional QoS Control information (QoS data frames only), and optional High Throughput (HT) Control fields (+HTC frames only);

b) A variable-length frame body, which contains information specific to the frame type and subtype;

c) A Frame Check Sequence (FCS), which contains an IEEE 32-bit CRC(Cyclic Redundancy Check).

In the MAC frame format, referring to b) the frame body component, the frame body components is divided into b-1) a non-information-elements field and b-2) an information elements field.

b-1) The non-information-elements field includes b-1-1) a Max Transmit power field and b-1-2) a Transmit power Used field.

b-1-1) The Max Transmit power field is a two's complement signed integer and is 1 octet in length, providing an upper limit, in units of dBm, on the transmit power as measured at the output of the antenna connector to be used by that AP on the current channel. The maximum tolerance for the value reported in Max Transmit power field shall be 5 dB. The value of the Max Transmit power field shall be less than or equal to the Max Regulatory Power value for the current channel.

b-1-2) The Transmit power Used field is a two's complement signed integer and is 1 octet in length. It is less than or equal to the Max Transmit power and indicates the actual power used as measured at the output of the antenna connector, in units of dBm, by an STA when transmitting the frame containing the Transmit power Used field. The Transmit power Used value is determined anytime prior to sending the frame in which it is contained and has a tolerance of ±5 dB.

Subsequently, in b) the frame body component, b-2) the information elements will be described. b-2) Information elements are defined to have a common general format consisting of a 1 octet Element ID field, a 1 octet Length field, and a variable-length element-specific Information field as shown in FIG. 1D(a). Each element is assigned a unique Element ID as FIG. 1C. The Length field specifies the number of octets in the Information field. b-2) The information elements include b-2-1) a Power Constraint element and b-2-2) a Power Capability element.

b-2-1) Power Constraint element contains the information necessary to allow an STA to determine the local maximum transmit power in the current channel. The format of the Power Constraint element is shown in FIG. 1D (b). The field is coded as an unsigned integer in units of decibels. The local maximum transmit power for a channel is thus defined as the maximum transmit power level specified for the channel in the Country element minus the local power constraint specified for the channel (from the MIB) in the Power Constraint element. The Power Constraint element is included in Beacon frames, and Probe Response frames.

To describe the use of the power constraint element, specification of regulatory and local maximum transmit power levels will be described. A lower local maximum transmit power level may be used for other purposes (e.g., range control, reduction of interference). An AP in a BSS, an STA in an Independent BSS (IBSS), and a mesh STA in a Mesh BSS (MBSS) shall advertise the regulatory maximum transmit power for that STA's operating channel in Beacon frames and Probe Response frames using a Country element. An AP in a BSS, an STA in an IBSS, and a mesh STA in an MBSS shall advertise the local maximum transmit power for that STA's operating channel in Beacon frames and Probe Response frames using the combination of a Country element and a Power Constraint element.

Selection of a transmit power will be described. An STA may select any transmit power for transmissions in a channel within the following constraints: 1) An STA shall determine a regulatory maximum transmit power and a local maximum transmit power for a channel in the current regulatory domain before transmitting in the channel. 2) An AP shall use a transmit power less than or equal to the regulatory maximum transmit power level for the channel. 3) The AP shall also meet any regulatory mitigation requirements. 4) An STA that is not an AP shall use a transmit power less than or equal to the local maximum transmit power level for the channel.

b-2-2) The Power Capability element specifies the minimum and maximum transmit powers with which an STA is capable of transmitting in the current channel. The format of the Power Capability element is shown in FIG. 1D (c). The Power Capability element is included in Association Request frames, Reassociation Request frames, and Mesh Peering Open frame.

Referring to association based on transmit power capability, an STA shall provide an AP with its minimum and maximum transmit power capability for the current channel when associating or reassociating, using a Power Capability element in Association Request frames or Reassociation Request frames. An AP may use the minimum and maximum transmit power capability of associated STAs as an input to the algorithm used to determine the local transmit power constraint for any BSS it maintains.

1-3. IEEE 802.11 TPC Procedures

Next, the transmit power control (TPC) procedures will be described.

Regulations that apply to the 5 GHz band in most regulatory domains require Radio Local Area Networks (RLANs) operating in the 5 GHz band to use transmitter power control, involving specification of a regulatory maximum transmit power and a mitigation requirement for each allowed channel, to reduce interference with satellite services. IEEE 802.11 standard describes such a mechanism, referred to as transmit power control (TPC).

This subclause describes TPC procedures that may satisfy needs in many regulatory domains and other frequency bands and may be useful for other purposes (e.g., reduction of interference, range control, reduction of power consumption).

The TPC procedures provide for the following: 1) Association of STAs with an AP in a BSS based on the STAs' power capability. 2) Specification of regulatory and local maximum transmit power levels for the current channel. 3) Selection of a transmit power for each transmission in a channel within constraints imposed by regulatory and local requirements. 4) Adaptation of transmit power based on a range of information, including path loss and link margin estimates.

Referring to selection of Transmit power for each transmission in IEEE 802.11, the STA transmits max/min power capabilities thereof to the AP during association. The AP calculates a local power constraint based on the max/min power capabilities of the STA. The AP transmits the following parameters 1) to 3) via a beacon or probe response message: 1) Local Maximum Transmit power (=Max Transmit power in Country element−Local Power Constraint), wherein the Max Transmit power is equal to or less than a Max Regulatory Power value for the current channel, 2) Local Power Constraint and 3) Regulatory Maximum Transmit power.

The transmit power of the STA is equal to or less than the local maximum transmit power (STA's transmit power<=Local maximum transmit power), and the transmit power of the AP is equal to or less than a regulatory maximum transmit power (AP's transmit power<=Regulatory maximum transmit power).

Subsequently, referring to adaptation of the transmit power, an STA may use any criteria, and in particular any path loss and link margin estimates, to dynamically adapt the transmit power for transmissions of a MAC Protocol Data Unit (MPDU) to another STA.

An STA may use a TPC Request frame to request another STA to respond with a TPC Report frame containing link margin and transmit power information. An STA receiving a TPC Request frame shall respond with a TPC Report frame containing the power used to transmit the response in the Transmit power field and the estimated link margin in a Link Margin field.

An AP in a BSS or an STA in an IBSS shall autonomously include a TPC Report element with the Link Margin field set to 0 and containing transmit power information in the Transmit power field in any Beacon frame or Probe Response frame it transmits. The Link Margin field contains the link margin for the receive time and for the receive rate of the frame containing the TPC Request element or the Link Measurement Request frame. The field is coded as a two's complement signed integer in units of decibels. The Link Margin field is reserved when a TPC Report element is included in a Beacon frame or Probe Response frame.

Power Control of 2. 3GPP LTE/LTE-A

Figure 2A:
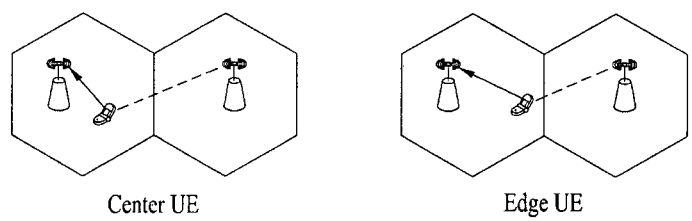
FIG. 2a is a diagram illustrating UL power control of 3GPP.
Figure 2A:
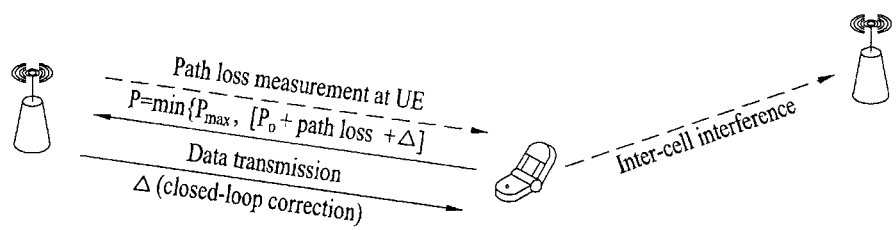
Figure 2B:
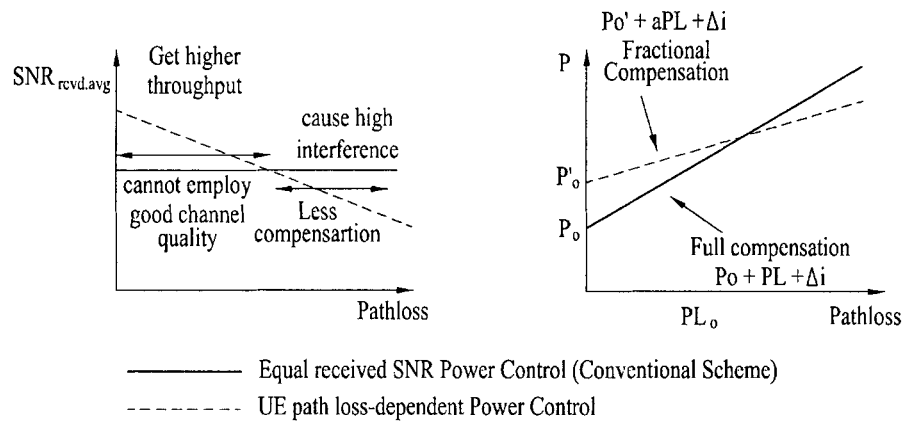
FIG. 2b is a diagram illustrating pass loss compensation methods in UL power control of 3GPP.

Hereinafter, power control of 3GPP will be described. Downlink power control determines the energy per resource element (EPRE). The term resource element energy denotes the energy prior to Cyclic Prefix (CP) insertion. The term resource element energy also denotes the average energy taken over all constellation points for the modulation scheme applied. Uplink power control determines the average power over an SC-FDMA symbol in which the physical channel is transmitted. FIGS. 2a and 2b are diagrams illustrating UL power control of LTE.

UL power control is defined by Equation 1 below.

$$P(i) = \min\{P\max, 10 \log 10(M(i)) + Po(j) + \alpha \cdot PL + \Delta MCS(i) + f(i)\} \quad \text{Equation 1}$$

In Equation 1, Pmax, is maximum power allowed to a UE and is fixed. Pmax, depends on UE class. $10 \log 10(M(i))$ corresponds to assigned resource blocks (1, 2, . . . , 110) and is updated per subframe. Po (j) is defined as a sum of Po_Cell_Specific signaled from higher layers and Po_UE_Specific configured by radio resource control (RRC). Po (j) has resolution of 1 dB and is different from Po of a physical uplink shared channel (PUCCH) and a physical uplink control channel (PUCCH). α·PL is a factor for compensating for path loss, a is equal to or less than 1, has 3 bits and is cell-specific. If α=1, path loss is fully compensated for. If a<1, path loss is partially compensated for (FPC: fractional power compensation). Path loss (PL) is an estimate of downlink path loss calculated at a UE.

In power control for a PUSCH in LTE, transmit power Ppusch is configured in the UE as shown in Equation 2 below.

$$P\text{pusch}(i) = \min\{Pc\max, 10 \log 10(M\text{pusch}(i)) + Po\_\text{pusch}(j) + \alpha(j) \cdot PL + \Delta tf(i) + f(i)\} \quad \text{Equation 2}$$

Pcmax denotes the configured UE transmitted maximum power. $10 \log 10(M\text{pusch}(i))$ is a bandwidth factor. $Po\_\text{pusch}(j) + \alpha(j) \cdot PL$ means a basic open-loop operating point. $\Delta tf(i) + f(i)$ is a dynamic factor. Mpusch(i) means the bandwidth of the PUSCH resource assignment expressed in number of resource blocks (RBs). Po_pusch(j)=Po_nominal_pusch+Po_ue_pusch is defined, Po_nominal_pusch is Cell specific, Po_ue_pusch is UE specific. For j=0 and 1, for $\alpha \in \{0, 0.4, 0.5, 0.6, 0.7, 0.8, 0.9, 1\}$, a 3-bit cell specific parameter is provided by higher layers. PL is the downlink path-loss estimate calculated in the UE in dB. PL=referenceSignalPower−higher layer filtered RSRP (Reference Signal Received Power) is defined.

Figure 2C:
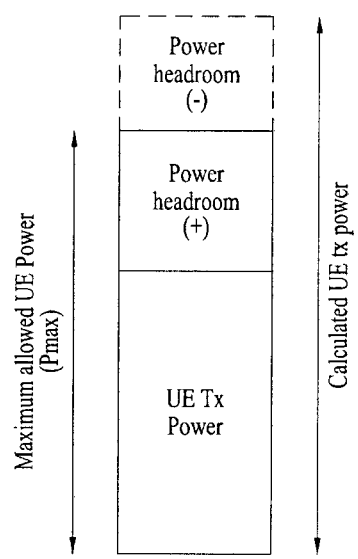
FIG. 2c is a diagram showing power headroom reporting of 3GPP.

For UL Power Control, the UE performs power headroom reporting. FIG. 2C shows power headroom reporting. Power headroom is a positive value (Difference between the UE tx power and the max UE tx Power) or a negative value (Difference between the max UE tx power and calculated UE tx power, according to UL power control formula, when calculated tx power exceeds the maximum power). The Power headroom is in the range [40, −23] dB with resolution of 1 dB and is expressed by 6 bits.

Power headroom reporting is triggered in the following cases. 1) DL pathloss change (e.g., [1, 3, 6, inf] dB), 2)

Power headroom periodicity (e.g., [20, 200, 1000, inf] TTIs), 3) Minimum Power Headroom (PH) reporting time (e.g., [0, 100, 200, 1000] TTIs), 4) Power headroom report is always valid for the Transmission Time Intervals (TTIs) in which UpLink (UL) grant is sent.

3. Multi-RAT Environment

Prior to a description of a multi-RAT environment according to the present invention, inter-RAT in a conventional multi-RAT environment will be briefly described. The conventional inter-RAT technology is designed according to a request of a UE and thus interworking between a WLAN and a cellular network is not performed. A specific network server manages WLAN information and inter-RAT handover is performed according to the request of the UE. A UE may simultaneously access a multi-RAT using a method for supporting only flow mobility/IP-flow mapping at a network level without control of a radio level.

Conventionally, a method for supporting multiple RATs at a UE includes IP flow mobility (IFOM) and multi access packet data network conductivity (MAPCON). IFOM is a WLAN offloading technology of a dual stack mobile IPv6 (DSMIPv6) based IP flow unit in 3G/Wi-Fi Seamless Offload (Rel-10) of 3GPP. DSMIPv6 is a solution for simultaneously supporting IPv4 and IPv6 at a UE and a network and has been employed, because IPv6 expands due to diversification of a mobile communication network and mobility support is spotlighted as core network and thus an existing IPv4 network needs to support mobility. IFOM is a client-based mobile IP (MIP) technology of, at a UE, detecting movement thereof and notifying an agent of the movement thereof. An agent for managing mobility of a mobile node includes a home agent (HA) and the HA uses a flow binding table and a binding cache table. Meanwhile, if PMIPv6 is used, IFOM uses only DSMIPv6 due to a technical problem that management of an IP flow unit is difficult.

MAPCON is a technology for simultaneous multiple PDN connectivity to different access point names (APNs) and is protocol independent and PMIPv6, GTP and DSMIPv6 may be all used. According to MAPCON, all data flows transmitted via one PDN are moved.

Such a conventional technology does not require a control connection between an AP and a cellular network and is based on a request of a UE. However, in order to increase overall network efficiency through use of multi-RAT, tightly-coupled network based management is necessary rather than based on the request of the UE. In the embodiments of the present invention, a direct control connection between different RATs is established such that efficient fast inter-RAT interworking becomes possible.

In the conventional technology, if a multi-RAT UE simultaneously accesses two different RATs to simultaneously transmit data, transmit power of the UE is a sum of transmit powers used for the RATs and maximum transmit power of an arbitrary multi-RAT UE may exceed a reference value. In one embodiment of the present invention, in order to solve the problem of the conventional technology, a method for controlling total transmit power of a multi-RAT UE is proposed.

In summary, maximum transmit power constraint of a dual-mode UE includes transmit power constraint of an 802.11 UE and transmit power constraint of a cellular UE.

In the transmit power of the 802.11 UE, the transmit power of the UE used in the IEEE 802.11 WLAN is determined by the maximum transmit power of the AP and the local power constraint of the AP. The local power constraint of the AP is determined by max/min transmit power capabilities of UEs.

1. Each UE transmits max/min power capabilities thereof to the AP during association.

2. The AP calculates the local power constraint based on the received max/min power capabilities of the UEs.

3. The AP transmits the following parameters via a beacon or a probe response message.

Parameter 1. Local Maximum Transmit power (=Max Transmit power−Local Power Constraint), Max Transmit power<=Max Regulatory Power value for the current channel;

Parameter 2. Local Power Constraint

Parameter 3. Regulatory Maximum Transmit power

The transmit power of the UE is equal to or less than local maximum transmit power (STA's transmit power<=Local maximum transmit power), and the transmit power of the AP is equal to or less than regulatory maximum transmit power (AP's transmit power<=Regulatory maximum transmit power).

The transmit power of a cellular UE is expressed by Equation 2 above.

Here, definition of the transmit power of the multi-RAT UE capable of performing simultaneous data transmission to multiple RATs is discussed. For example, whether the UL transmit power of the multi-RAT UE allows a sum of maximum powers of conventional STAs or UEs (802.11 STA Transmit power+LTE UE Transmit power) is discussed.

At least the max Multi-RAT UE power<=the 802.11 STA transmit power+the LTE UE transmit power should be satisfied. To this end, STA_Pmax of 802.11 and E_Pmax of LTE may be set to be lower than respective existing values. If STA_Pmax and UE_Pmax are set to be lower than the respective existing values, data transmission of a cell edge UE is likely to fail. In addition, Over-the-air QoS may not be ensured. As a result, there is a need for a solution for simultaneous data transmission of a cell edge UE to a WLAN/cellular network.

Figure 3A:
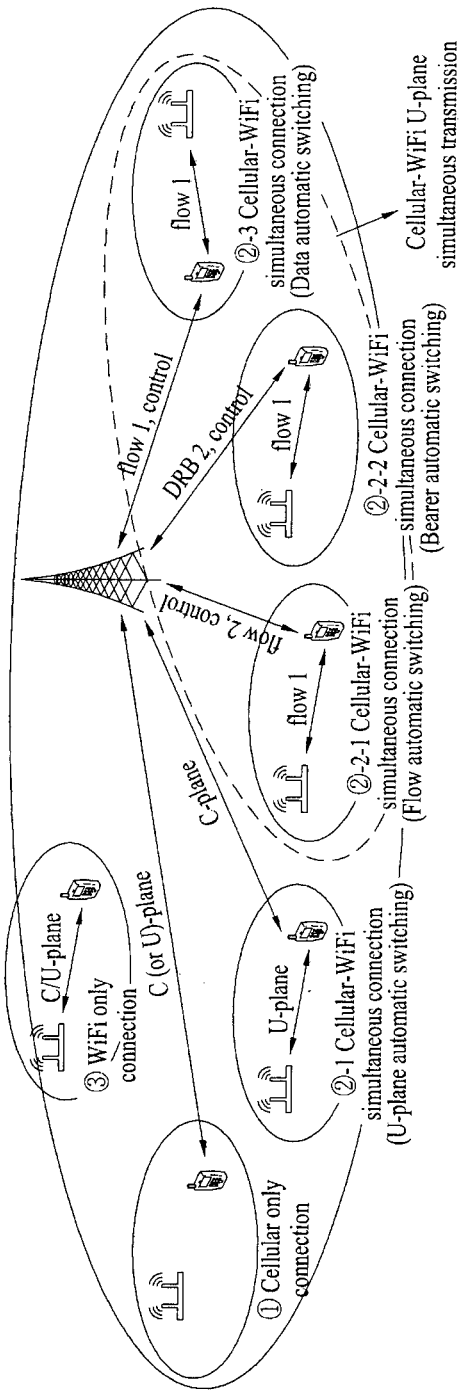
FIGS. 3a and 3b are diagrams showing a multi-RAT environment according to embodiments of the present invention.

FIG. 3 is a diagram showing a multi-RAT environment according to one embodiment of the present invention.

In ①, technical predefinition is necessary such that a UE performs Wi-Fi automatic switching/simultaneous transmission in a state of accessing only a cellular network. AP information management for interworking is performed at the network level (cellular-Wi-Fi) and Wi-Fi discovery and Wi-Fi network access are performed at the device level (cellular-device-Wi-Fi).

②-1 to ②-3 indicate Wi-Fi automatic switching of a user plane, Wi-Fi automatic switching of a flow, Wi-Fi automatic switching of a bearer and Wi-Fi automatic switching of data. Definition of a procedure for, at a UE which wishes to be connected to an AP in an idle state, requesting state switching of the AP is necessary.

When cellular-Wi-Fi U-plane automatic switching is performed according to ②-1, all data is transmitted using Wi-Fi only. When cellular-Wi-Fi U-plane is switched to simultaneous transmission according to ②-2 and ②-3, simultaneous data transmission via Wi-Fi and cellular network using a bandwidth segregation or aggregation scheme is possible. Here, in bandwidth segregation, automatic switching is performed per flow (service/IP flow) as in ②-2 and different flows are transmitted via different RATs. In ②-2, automatic switching per flow may be automatic switching per one or more service/IP flow(s). That is, switching may be performed per flow ((②-2-1) or per data radio (or EPS) bearer (②-2-2). In bandwidth aggregation, the same flow may be transmitted via different RATs in data units, as in ②-3.

After Wi-Fi automatic switching has been performed as in CD, cellular link control based on Wi-Fi is possible as in ③. Control for cellular link paging or radio link failure may be received via a Wi-Fi link.

In the following embodiments, a procedure for, at a UE, simultaneously transmitting data via multi-RAT in ② is defined.

Figure 3B:
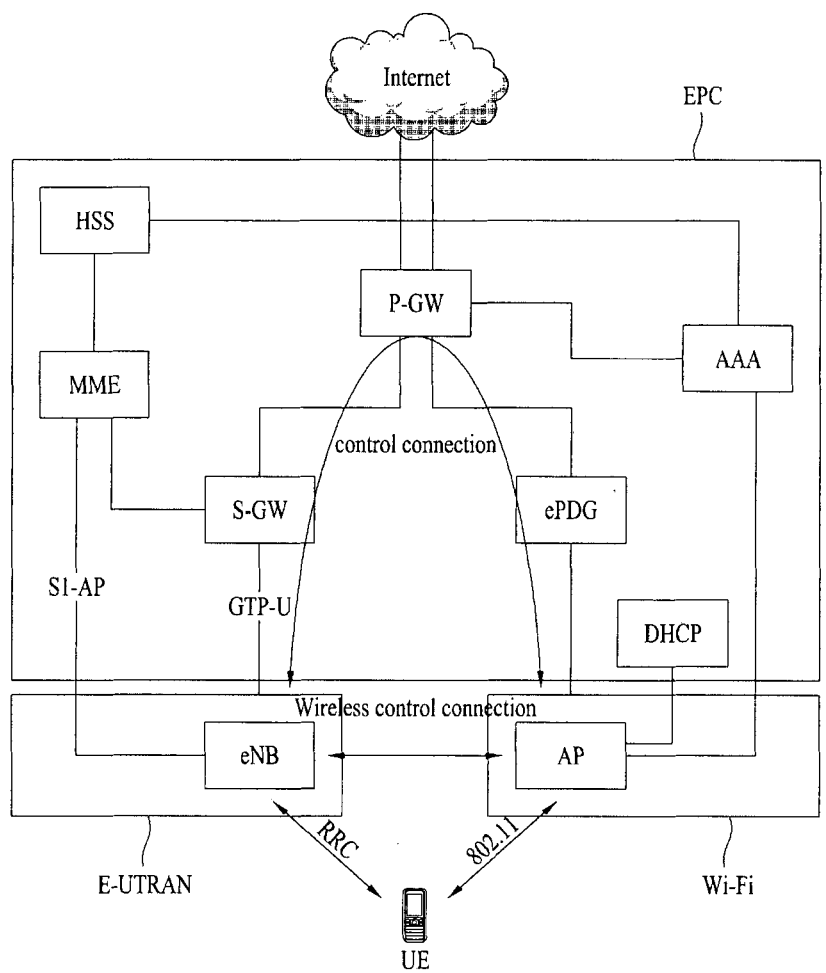

FIG. 3b is a diagram showing a multi-RAT environment according to another embodiment of the present invention. In the multi-RAT environment shown in FIG. 3b, two different RATs are merged. Assume that a first RAT is a cellular system (e.g., an LTE/LTE-A or WiBro system) and a second RAT is a Wi-Fi system. The present invention is not limited thereto.

Referring to FIG. 3b, the multi-RAT environment includes an evolved packet core (EPC), an evolved universal terrestrial radio access network (E-UTRAN), a wireless local area network (WLAN) and a packet data network (PDN). The WLAN may be an IEEE 80.211 Wi-Fi network and the PDN may be the Internet. However, the present invention is not limited thereto. The E-UTRAN includes an eNode B (eNB) and Wi-Fi includes an AP. The eNB and the AP correspond to a base station of the first RAT and a base station of the second RAT.

The EPC includes a serving-gateway (S-GW), a mobility management entity (MME), a home subscriber server (HSS), a PDN gate way (P-GW), an evolved packet data gateway (ePDG), a dynamic host configuration protocol (DHCP) server and an authentication authorization accounting (AAA) server. A GTP-U interface is present between the S-GW and the eNB and an SI-AP interface is present between the eNB and the MME.

The HSS stores and manages subscriber information. The MME authenticates a UE using the HSS when the UE attempts to access a cellular network, is managing security for protection of communication of a UE and manages mobility of the UE. The S-GW connects the UE to the PDN via the P-GW. The ePDG performs association of an evolved packet system (EPS) with an untrusted non-3GPP access system (e.g., WLAN). The AAA server provides information for authenticating access of the UE via the WLAN to the ePDG.

In the multi-RAT environment shown in FIG. 3b, a control connection for interworking is present between the first RAT and the second RAT. The control connection may be a wireless control connection between the eNB of the first RAT and the AP of the second RAT or a wired control connection via a backbone network, such as a public data network gateway (P-GW) and an evolved packet core (EPC).

In order to increase overall system energy efficiency, an interworking entity (hereinafter, referred to as an IWE) of the multi-RAT may instruct Tx/Rx power of a specific RAT to be turned on/off or control status transition of a node (e.g., AP) of the specific RAT, under specific conditions. In an AP jamming environment, interference mitigation between APs may also be controlled by the IWE.

Although the IWE may be an arbitrary node located in the first RAT, for example, the cellular network, it is assumed that an interworking function is performed in the following three entities. Accordingly, the IWE may be any one of (1), (2) and (3) and the present invention is not limited thereto.

(1) eNB—reuse of an existing entity
(2) MME—reuse of an existing entity
(3) interworking management entity (IWME)—definition of a new entity Before the UE simultaneously, accesses multiple RATs, the IWE may aid the UE in selecting an optimal RAT or AP. To this end, the IWE may collect information on the second RAT such as Wi-Fi from the UE or the AP in advance.

According to one embodiment of the present invention, the UE receives information on the second RAT and the AP of the second RAT from the first RAT before accessing the second RAT. If the AP of the second RAT detected by the UE is in an idle mode, a method for switching the state of the AP of the second RAT to an active mode by the request of the UE is proposed.

For peak throughput and data traffic offloading, the UE may simultaneously support the first RAT and the second RAT via multi-RAT interworking. Here, the first RAT may be referred to as a primary network or a primary system and the second RAT may be referred to as a secondary network or a secondary system. For example, the UE may be configured to simultaneously support LTE/LTE-A and Wi-Fi (near field communication system such as WLAN/802.11). Such UE may be referred to as a multi-system capability UE in the present specification.

In the network structure shown in FIG. 3b, the primary system has wider coverage and may be a network for control information transmission. Examples of the primary system include a WiMAX or LTE (LTE-A) system. The secondary system has narrow coverage and may be a system for data transmission. Examples of the secondary network include a wireless local area network system such as WLAN or Wi-Fi.

The embodiments of the present invention will be described on the following assumptions.

An interworking function is related to an interworking related procedure which may occur between eNB-UEs or eNB-APs and an IWE stores/manages AP information. The IWE stores/manages information on APs located in coverage thereof. Assume that the AP of the secondary system (e.g., Wi-Fi) and the IWE of the Primary system (e.g., LTE or WiMAX) may share necessary information via a control connection. In order to enable the AP and the IWE to share information, the following methods 1) to 4) may be used.

Method 1) Wired Control Connection

A network interface is established via a backbone network.

Method 2) Wireless Control Connection

According to Method 2), the AP has an air interface with the eNB and may be referred to as an eAP. For example, the eAP supports an LTE protocol stack for communication with the eNB as well as 802.11 MAC/PHY. The eAP may be regarded as an LTE UE in a relationship with the eNB and may communicate with the eNB.

Method 3) The AP and the IWE collect information on each other via a server rather than via an existing network such as an access network discovery service function (ANDSF).

In the embodiments of the present invention, the AP may switch the state thereof to an ON/OFF state (or an active/idle (sleep) mode) for overall system efficiency. The information on the AP, for example, state information, may be stored and managed by the IWE. As a method for, at the IWE, storing and managing the information on the AP, the following four methods A to D may be used depending on by which entity of the first RAT the IWE is implemented and the present invention is not limited thereto.

Method A) An air interface between the eNB and the AP is used.

The eNB controls the AP using a wireless control connection with the AP, similarly to a general UE.

Method B) A backhaul interface between the eNB and the AP is used.

The eNB controls the AP using a wired control connection with the AP.

Method C) A control interface between the MME and the AP is used.

The AP is controlled using a control connection between the MME and the AP (that is, the secondary system).

Method D) A control interface between the IWME and the AP is used.

The AP is controlled using a control connection between the IWME and the AP (that is, the secondary system).

Figure 4:
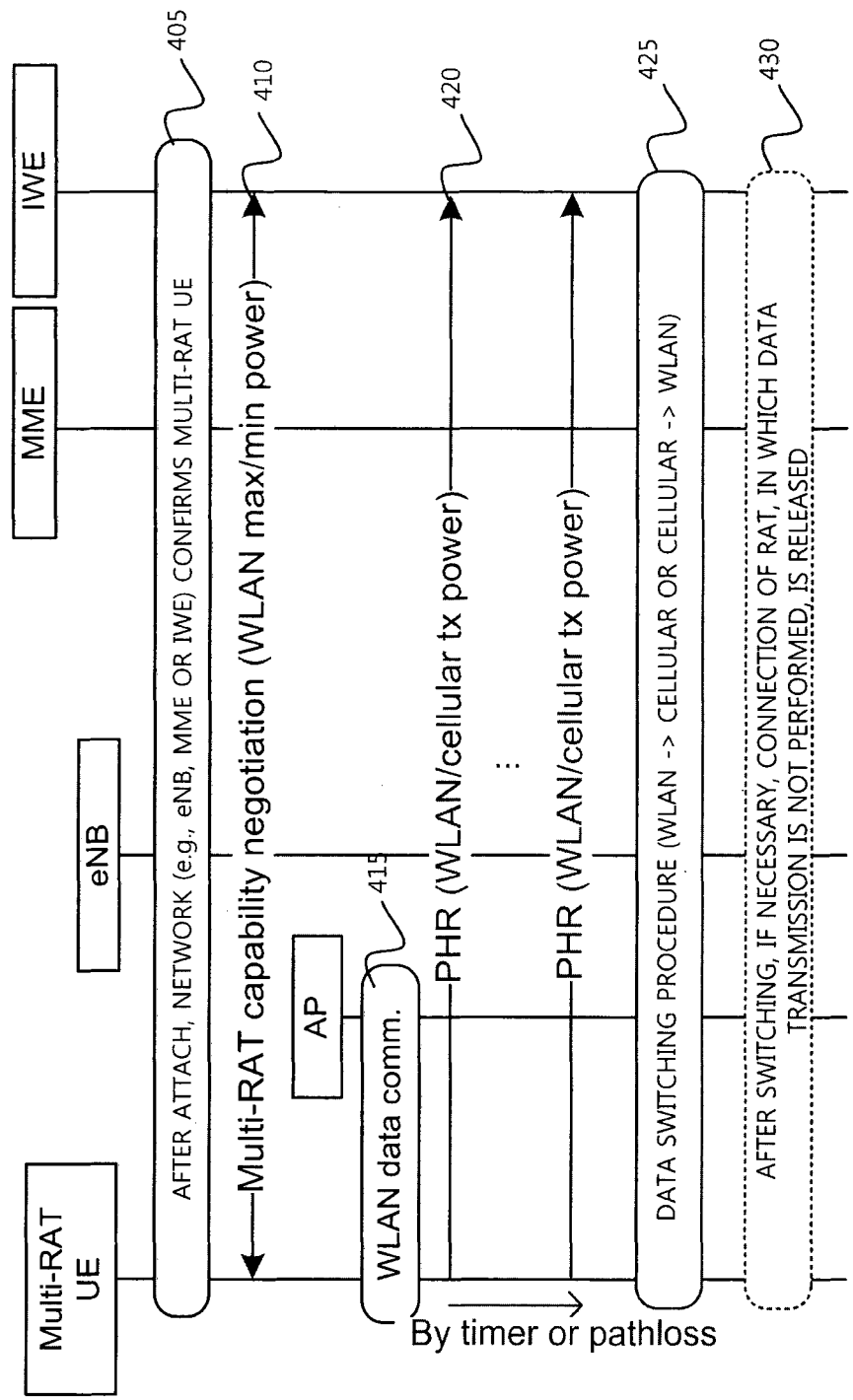
FIGS. 4 to 7 are diagrams showing a method for controlling an uplink of a UE in a multi-RAT environment according to embodiments of the present invention.

FIG. 4 is a diagram showing an uplink control method of a UE according to one embodiment of the present invention. The UE may simultaneously access a first RAT (e.g., a cellular network) and a second RAT (WLAN). For example, the UE may be a multi-RAT UE which simultaneously receives downlink data from the first RAT and the second RAT or simultaneously transmits uplink data to the first RAT and the second RAT. An indirect control connection of a backhaul network or a direct control connection of a wireless network is present between an AP of the second RAT and an IWE of the first RAT. Although the IWE is shown as being independent of the eNB and the MME in the first RAT in FIG. 4, the IWE may be included in the eNB or the MME. Although the base station of the first RAT is an eNB and the base station of the second RAT is an AP, the present invention is not limited thereto.

The entity of the first RAT, for example, the IWE, confirms that the UE is a multi-RAT UE (405). The IWE confirms that the UE is a multi-RAT UE, when the UE is attached to the first RAT or when the UE is attached to both the first RAT and the second RAT.

For example, when the UE enters the first RAT, the IWE may exchange capability information with the UE to confirm that the UE is a multi-RAT UE. When the UE enters the first RAT, the UE may transmit information indicating that the UE is a multi-RAT UE to the first RAT. Alternatively, the IWE may confirm that the UE is a multi-RAT UE by asking a predetermined node of the first RAT about capabilities of the UE. Here, the predetermined node may be an IWE or a server for storing subscriber information.

The UE may be connected to both the first RAT and the second RAT or may be connected to the first RAT only. If the UE is connected to the first RAT only, the UE may be connected to the second RAT according to an autonomous determination thereof or user manipulation.

In another embodiment, the IWE may support a connection of the UE to the second RAT. For example, the IWE pre-stores information on APs. The IWE provides information on the APs stored in the IWE to the UE according to a request of the UE or a determination of the IWE if the UE is a multi-RAT UE. The information on the APs provided to the UE may be information on APs of the second RAT located near the UE based on the location of the UE. The information on the APs may include the ID of the AP and the state information of the AP (e.g., on/off state or active/inactive state), for example. If the AP is in the off or inactive state, the IWE may wake the AP via the control connection with the AR Alternatively, the IWE may provide information necessary to wake the AP to the UE and the UE may directly wake the AP.

According to the above-described methods, the UE accesses the AP of the second RAT. The UE may switch a user data flow of the first RAT to the AP of the second RAT after accessing the AP of the second RAT. In the following description, assume that, even when the UE accesses the AP of the second RAT, the user data flow of the first RAT is not switched to the second RAT. For example, the UE may simultaneously perform data transmission and reception to and from the first RAT and the second RAT.

The UE and the IWE performs multi-RAT capability negotiation (410). That is, if the UE is a multi-RAT UE, the IWE performs multi-RAT capability negotiation with the UE. Although steps 405 and 410 are separately performed, steps 405 and 410 may be performed as one step.

The UE may transmit power capability information of the UE to the IWE of the first RAT in the multi-RAT capability negotiation process. The power capability information of the UE may be information on transmit power of the UE for transmission to the second RAT. The power capability information of the UE may be determined in a state in which the first RAT is not considered. For example, the power capability information of the UE may include at least one of WLAN max power, WLAN min power, power constraint element (local transmit power constraint), power capability element (maximum transmit power capability, minimum transmit power capability), local Maximum Transmit power, and regulatory maximum transmit power for current channel of the second RAT.

In addition, the power capability information of the UE may include maximum transmit power of the UE regardless of the type of the RAT. For example, the maximum transmit power of the UE may be restricted for user protection. In this case, the maximum transmit power of the UE is not specific to the type of the RAT.

The IWE determines a threshold of power for simultaneous transmission to the first RAT and the second RAT, for example, maximum transmit power Pmax, using the acquired power capability information of the UE, in the multi-RAT capability negotiation process. Here, Pmax is determined in a range which does not exceed a sum of maximum transmit power pmax_1 of the UE for the first RAT (e.g., power determined by Equation 2) and maximum power Pmax_2 of the UE for the second RAT (e.g., local maximum transmit power).

For example, the IWE may use at least one of power attenuation factors C1 and C2 of the Pmax_1 and Pmax_2 as in Equation 3. Here, C1 and C2 are preferably positive values equal to or less than 1. According to embodiment, the IEW may apply the power attenuation factor to any one of Pmax_1 and Pmax_2. The values of C1 and C2 may be variables determined according to the state of the UE or the network states of the first and second RATs or predetermined constants.

$$P\text{max} = C1 * P\text{max}\_1 + C2 * P\text{max}\_2 \qquad \text{Equation 3}$$

In another embodiment, the value Pmax may be maximum transmit power of the UE regardless of the type of the RAT. In another embodiment, the value Pmax may be the smaller of the maximum transmit power of the UE regardless of the type of the RAT and the power according to Equation 3.

The methods for determining the value Pmax are described for the purpose of describing that the IWE can determine the value Pmax according to various methods and the range of the present invention is not limited to the above-described embodiments.

According to embodiments, the IWE may transmit the determined value Pmax to the UE.

The UE transmits and receives data to and from the AP of the second RAT (415). For example, the UE may transmit uplink/downlink data to the eNB of the first RAT and, at the same time, transmit uplink/downlink data to the AP of the second RAT. The uplink data (hereinafter, referred to as UL data 1) transmitted to the eNB and uplink data (hereinafter, referred to as UL data 2) transmitted to the AP may be independent flows. Alternatively, the uplink data transmitted to the eNB and the uplink data transmitted to the AP may be different frames belonging to one flow.

The UE reports the transmit power of the UE upon transmission of UL data 1 and UL data 2 to the IWE of the first RAT (420). For example, the UE may report the transmit power of UL data 1 and the transmit power of UL data 2 to the IWE of the first RAT. Alternatively, the UE may report a sum of the transmit power of UL data 1 and the transmit power of UL data 2.

In another embodiment, the UE may transmit a power headroom report (PHR) to the IWE. The PHR may be Pmax−(the transmit power of UL data 1+the transmit power of UL data 2). In another embodiment, the PHR may include PHR1 for the first RAT and PHR2 for the second RAT. For example, PHR1 may be transmit power of Pmax_1−UL data 1 and PHR 2 may be transmit power of Pmax_2−UL data 2. In another embodiment, PHR1 and PHR2 may be separately reported to the IWE.

The transmit power of the UE upon UL data 1 and UL data 2 may be transmit power of the UE during an arbitrary TTI or instantaneous power of the UE. For example, the UE may report the transmit power consumed upon transmission of UL data 1 and/or UL data 2 of a specific number of frames (or subframes) to the IWE or report instantaneous power of the UE upon reporting to the IWE. Alternatively, the UE may report transmit power consumed from a time when transmit power was reported to the IWE in the past to a current reporting time to the IWE.

The UE may report the transmit power of the UE upon transmission of UL data 1 and UL data 2 to the IWE periodically or according to an event triggered method. If the transmit power of the UE is reported to the IWE periodically, the period is predetermined with respect to the UE and may be determined by the IWE and sent to be UE. According to the event triggered method, the UE may report the transmit power to the IWE if the UE enters the coverage of the second RAT (e.g., the intensity of the signal of the AP is equal to or greater than a threshold), if traffic of a specific condition (e.g., traffic to be transmitted to the second RAT) is generated, if the transmit power of the UE exceeds Pmax, if the power headroom is equal to or less than a threshold, if traffic of UL data 1 and/or UL data 2 of the UE exceeds a threshold, if the IWE instructs reporting, if interference with another UE/cell caused by the UE exceeds a threshold, if interference caused by another UE/cell exceeds a threshold, or if the UE is performing a specific procedure (e.g., a random access procedure). The event is not limited to the above-described events.

The IWE may control uplink data transmission of the UE depending on whether the transmit power of the UE exceeds Pmax. If the transmit power of the UE does not exceed Pmax, the IWE may not respond to the report of the transmit power of the UE.

If it is determined that the transmit power of the UE exceeds Pmax, the IWE transmits an instruction for restricting use of UL of the first RAT or the second RAT to the UE. For example, if the sum of transmit power for all serving cells of the first RAT+the second RAT transmit (or maximum) power>Pmax, the IWE controls the UE to switch or stop a flow of uplink data for one of the first and the second RATs. The IWE may transmit, to the UE, a secondary system management (SSM) message or a data switch related message for managing the second RAT.

The SSM message or the data switch related message may include information indicating that a purpose of a message is uplink data flow switch or stop (e.g., action code or reason code: WLAN/cellular UL link management/initiation), an RAT indicator indicating an RAT for restricting (or maintaining) uplink data transmission between the first RAT or the second RAT and information on a condition for recovering uplink data flow switch or stop. New parameters may be further included.

The UE selectively deactivates an uplink for one of the first and the second RATs according to the instruction of the IWF (425). Deactivation may mean that an RF of a specific UL is off or specific UL data transmission is not performed. In a WLAN, since DL data transmission (e.g., RTS, CTS) is impossible without control message transmission, deactivation may mean that UL data transmission is not performed rather than that the RF is off.

For example, the UE switches a flow of uplink data of one of the first and the second RATs to another RAT or stops uplink data transmission of one of the first and the second RATs. The UE may report a message indicating that the flow of the uplink data of one of the first and the second RATs is switched or stopped to the IWE of the corresponding RAT and/or the first RAT. Even when the flow of the uplink data is switched or stopped, downlinks of the first RAT and the second RAT may be maintained. Accordingly, the UE may simultaneously receive downlink data from the first RAT and downlink data from the second RAT. According to the command from the IWE of the first RAT (or according to the determination of the UE), the uplink schedule of the UE for the first RAT or the second RAT may be changed.

When the flow of the uplink data is switched or stopped, the UE may release the uplink connection of the RAT to which uplink data is no longer transmitted (430).

If a predetermined termination condition is satisfied, uplink control of the UE may be terminated according to the determination of the UE or the instruction of the IWE. If the predetermined termination condition is satisfied, a procedure for selectively deactivating the uplink of the UE may be terminated. For example; if the transmit power does not exceed Pmax when the UE simultaneously transmits uplink data to the first RAT and the second RAT, if the UE escapes from the coverage of one of the first and the second RATs, or if all uplink data has been transmitted from the UE and thus uplink data no longer flows, the procedure is terminated. If the UE escapes from the coverage of one of the first and the second RATs and if uplink data no longer flows, uplink control is preferably terminated according to the determination of the UE.

Whether the transmit power exceeds Pmax when the UE simultaneously transmits uplink data to the first RAT and the second RAT may be determined by the IWE. The IWE determines whether the power headroom of the UE is sufficient based on information on the transmit power received from the UE (e.g., PHR or WLAN power capabilities). If it is determined that the power headroom of the UE is sufficient, the IWE transmits an SSM message to the UE in order to recover the switched or stopped flow of the uplink data. The SSM message may include information indicating that the purpose of the message is uplink control termination (e.g., action code or reason code: WLAN/cellular UL link management/termination).

The flow of the uplink data switched to another RAT may be switched to an original RAT or temporarily stopped uplink data transmission may be resumed.

Although the IWE determines whether the transmit power of the UE exceed Pmax in the embodiment of the present invention, in another embodiment, the UE may determine whether the transmit power of the UE exceeds Pmax according to and control uplink data transmission. In this case, step 420 may be omitted.

Figure 5:
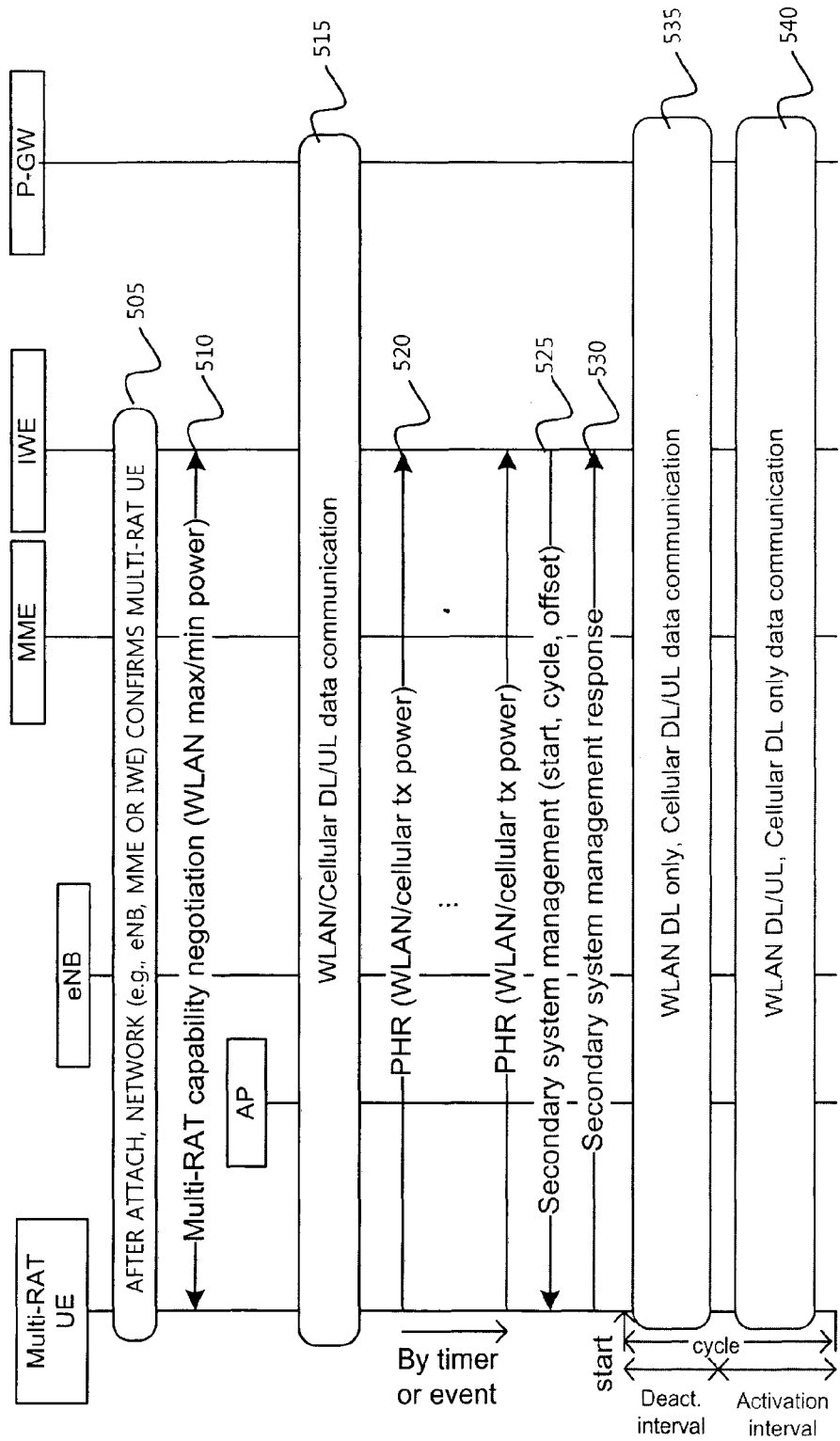

FIG. 5 is a diagram showing an uplink control method of a UE according to another embodiment of the present invention. The above description may be referred to for understanding of the embodiment of FIG. 5 and a repeated description of FIG. 4 will be omitted.

An entity of the first RAT, that is, an IWE, confirms that the UE is a multi-RAT UE (505). The UE and the IWE perform multi-RAT capability negotiation (510). The UE transmits and receives uplink/downlink data to and from the base station (e.g., the eNB) of the first RAT and the base station (e.g., the AP) of the second RAT (515). The UE reports the transmit power of the UE upon transmission of UL data 1 and UL data 2 to the IWE of the first RAT (520). The IWE may control uplink data transmission of the UE depending on whether the transmit power of the UE exceeds Pmax.

If it is determined that the transmit power of the UE exceeds Pmax, the IWE transmits an instruction for restricting use of the UL of the first RAT or the second RAT to the UE (525). That is, the IWE transmits a secondary system management (SSM) message to the UE.

The embodiment of FIG. 5 is different from the embodiment of FIG. 4 in that the UE sequentially and alternately transmits uplink data to the first RAT and the second RAT. For example, the uplink schedule of the UE is changed based on the command from the IWE of the first RAT or the determination of the UE. That is, the schedule is changed such that uplink data of the first RAT and uplink data of the second RAT, which was simultaneously transmitted, are alternately transmitted.

Accordingly, although the UE uses only the uplink of one of the first and the second RATs in FIG. 4, in FIG. 5, the UE uses both the uplink of the first RAT and the uplink of the second RAT but does not simultaneously use the uplink of the first RAT and the uplink of the second RAT. In FIG. 5, the UE uses the uplink of the first RAT and the uplink of the second RAT using a time division method. The uplink of one of the first and the second RATs is selectively deactivated and the UE sequentially deactivates the uplink of the first RAT and the uplink of the second RAT according to a predetermined cycle. Since the UE keeps the downlinks of the first RAT and the second RAT in an active state, the UE may simultaneously receive the downlink data of the first RAT and the downlink data of the second RAT.

As an example of the instruction transmitted from the IWE to the UE in step 525, the SSM message will be described. The SSM message may include at least one of a deactivation order of the uplinks of the first RAT and the second RAT, a deactivation cycle, a deactivation time of a specific RAT within the deactivation cycle, a start time of the deactivation cycle and an offset from the start time.

For example, the SSM message may include at least one of the following parameters.

1) action code or reason code of SSM: This is set to "WLAN/cellular UL link management/initiation in order to indicate the purpose of transmitting the SSM message.

2) WLAN/cellular indicator (1 bit or 2 bits): This indicates whether the UL of the WLAN is deactivated first or the UL of the cellular network is deactivated first. That is, the deactivation order is indicated. If the parameter is null or is not defined, this may mean that the UL of the WLAN or the cellular network is always deactivated first. In FIG. 5, the UL of the WLAN is deactivated first.

3) UL deactivation cycle: The UL of the WLAN and the UL of the cellular network are activated/deactivated once during one UL deactivation cycle. One UL deactivation cycle may include 4) a UL deactivation interval and 5) a UL activation interval. The SSM message may include at least one of 4) and 5).

4) The UL of the RAT indicated by the WLAN/cellular indicator is deactivated during a UL deactivation interval.

5) The UL of the RAT indicated by the WLAN/cellular indicator is activated during a UL activation interval. A switching offset of a predetermined length may be present between the UL deactivation interval and the UL activation interval or a switching offset may be 0. For example, during the interval excluding the UL deactivation interval within one UL deactivation cycle, the UL of the remaining RAT which is not indicated by the WLAN/cellular indicator is deactivated.

Deactivation may mean that an RF of a specific UL is off or specific UL data transmission is not performed. In a WLAN, since DL data transmission (e.g., RTS, CTS) is impossible without control message transmission, deactivation may mean that UL data transmission is not performed rather than that the RF is off.

6) UL deactivation start ((sub)frame): This means a start time of a UL deactivation cycle. This may be expressed in frame or subframe units based on a cellular system.

7) UL deactivation offset ((sub)frame): This means an offset from a UL deactivation start time. From the UL deactivation offset, the UE deactivates the UL of the RAT indicated by the WLAN/cellular indicator. The UL deactivation offset may be 0. If the UL deactivation offset is not defined, the UL is deactivated from the UL deactivation start time.

In addition, parameters related to the predetermined termination condition for terminating selective deactivation of the uplink and other new parameters may be added to the SSM message.

If it is determined that the transmit power of the UE exceeds Pmax, the IWE generates and transmits the above-described SSM message to the UE.

The UE transmits an SSM response message to the IWE in response to the SSM message (530). The SSM response message is used to notify the IWE that the UE has received the SSM message and will perform a procedure indicated via the SSM message.

The UE transmits UL data only during a time scheduled to uplink with respect to the first RAT or the second RAT according to the parameters (e.g., UL deactivation cycle, UL deactivation start, UL deactivation offset and UL deactivation interval) of the SSM message received from the IWE (535 and 540). The terminal repeats the UL deactivation cycle until the predetermined termination condition is satisfied and repeatedly performs the procedures of 535 and 540.

In the embodiment of FIG. 5, the UE first deactivates the uplink of the second RAT, for example, the WLAN (535). During the deactivation interval, the second RAT is set to DL only and the first RAT keeps DL and UL.

During the interval except for the deactivation interval of the UL deactivation cycle, for example, during the UL activation interval, the UE deactivates the uplink of the first RAT, for example, the cellular network (540). During the UL activation interval, the uplink data of the second RAT is transmitted and the first RAT is set to DL only.

When the uplink control/scheduling procedure shown in FIG. 5 is performed, the UE transmits UL data to a specific RAT during the interval capable of using the UL of the specific RAT only. The UE buffers UL data generated during the interval which may not use the UL of the specific RAT and waits for a next interval capable of using the UL of the specific RAT. That is, the UE buffers uplink data for the first RAT or the second RAT generated while the first RAT or the second RAT is deactivated.

Even while the uplink control/scheduling procedure shown in FIG. 5 is performed, information on the transmit power of the UE (e.g., cellular PHR and WLAN related maximum or tx power information) may be transmitted to the IWE periodically or according to the event triggered method as defined. In addition, as described with reference to FIG. 4, if the predetermined termination condition is satisfied, the uplink control/scheduling procedure may be terminated.

Figure 6:
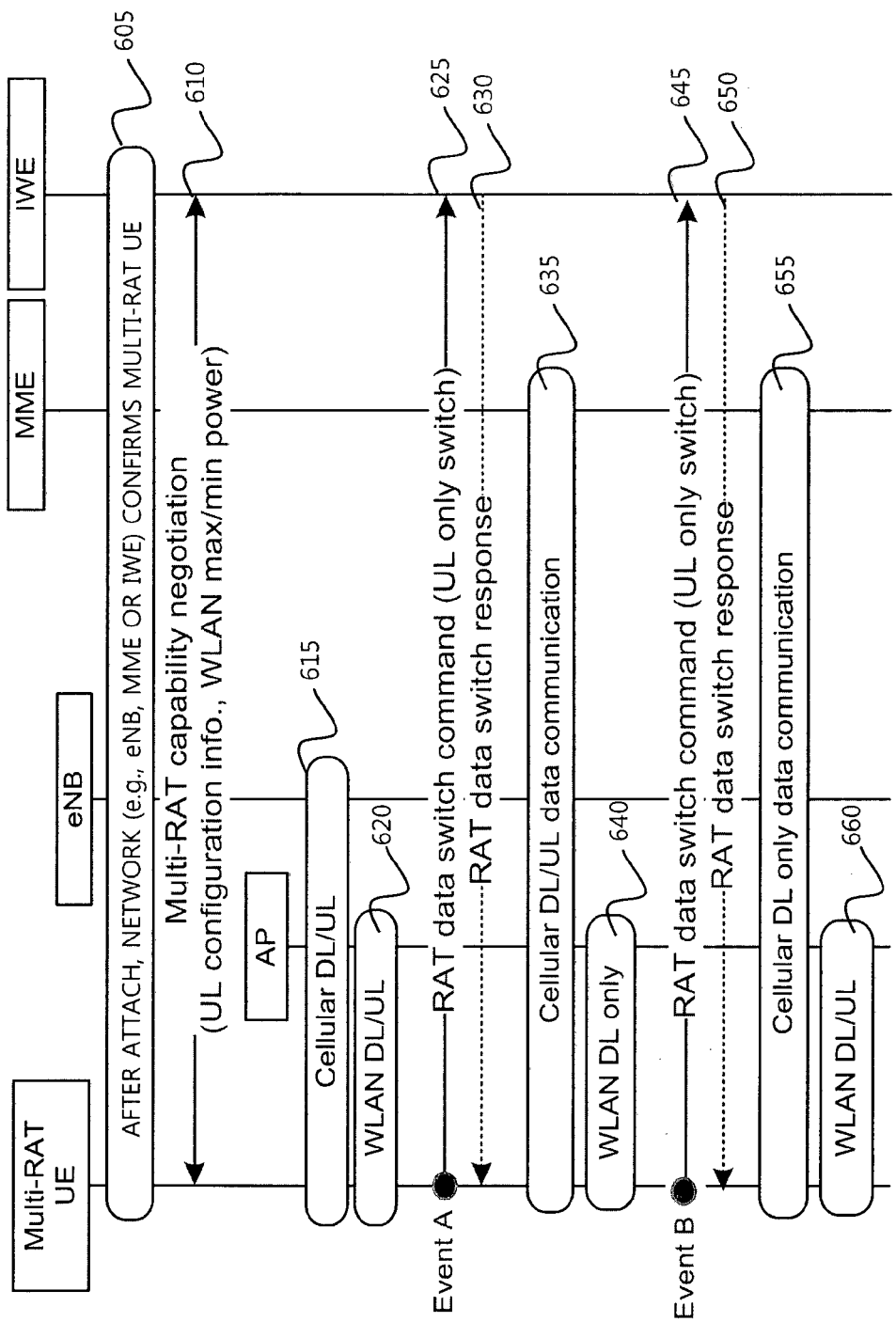

FIG. 6 is a diagram showing an uplink control method of a UE according to another embodiment of the present invention. The above description may be referred to for understanding of the embodiment of FIG. 6 and a repeated description of FIGS. 4 and 5 will be omitted.

An entity of the first RAT, that is, an IWE, confirms that the UE is a multi-RAT UE (605). The UE and the IWE perform multi-RAT capability negotiation (610).

The UE may receive uplink configuration information from the IWE via multi-RAT capability negotiation. The uplink configuration information is uplink control information and may include information on a trigger condition for starting an uplink control procedure. The trigger condition may be determined based on information on uplink transmit power for the second RAT transmitted from the UE to the IWE in step 610.

The trigger condition may include a condition (event B) for deactivating the uplink of the first RAT and a condition (event A) for deactivating the uplink of the second RAT. The trigger condition may include the location of the UE, interference with another UE or a neighboring cell, the load status of the first RAT or the second RAT and a procedure performed by the UE.

For example, the condition (event A) for deactivating the uplink of the second RAT includes the following events A-1 and A-2.

Event A-1. The load of the second RAT is high, that is, the load is equal to or greater than a specific threshold.

Event A-2. The UE is performing a random access procedure with respect to the first RAT, that is, the max power of the UE is restricted by a random access channel (RACH) of the first RAT.

For example, the condition (event B) for deactivating the uplink of the first RAT includes the following events B-1 to B-4.

Event B-1. The UE requires UL transmit power having a large value with respect to the first RAT, for example, the power headroom is equal to or less than a specific threshold or a sum of the tx powers which are being used by all serving cells is equal to or greater than a specific threshold.

Event B-2. The UL tx power of the UE for the first RAT significantly influences a neighboring cell UE as interference.

Event B-3. A UL data transfer rate of the UE for the first RAT is equal to or less than a specific value. For example, a cell edge UE should transmit data with power lower than actual power for interference mitigation, thereby increasing a data transmission error rate.

Event B-4. The UL load of the first RAT is high.

The uplink configuration information may further include information indicating which of the first RAT and the second RAT is deactivated, when the event A and the event B are both satisfied. For example, priority may be assigned to simultaneously satisfied trigger conditions among the trigger conditions. Accordingly, if the trigger conditions are simultaneously satisfied, the UE performs an operation corresponding to a trigger condition having higher priority. For example, an indicator indicating whether the event A or the event B is preferred may be transmitted by the IWE along with the trigger condition. In case of trigger due to Event A-2, that is, if the UE is performing the random access procedure, the uplink of the second RAT may be preferentially deactivated regardless of whether the other events are satisfied.

In addition, the uplink configuration information may include a condition for reactivating the uplink of the deactivated RAT. For example, a condition for activating the uplink of the first RAT and a condition for activating the uplink of the second RAT may be included in the uplink configuration information.

The UE transmits and receives uplink/downlink data to and from the base station (e.g., the eNB) of the first RAT and the base station (e.g., the AP) of the second RAT (615 and 620). The UE monitors whether the trigger condition is satisfied while transmitting and receiving the uplink/downlink data to and from the base station of the first RAT and the base station of the second RAT. The terminal determines whether the respective uplink data of the first RAT and the second RAT may be simultaneously transmitted to the base station of the first RAT and the base station of the second RAT based on the trigger condition.

When event A occurs, the UE deactivates the uplink of the second RAT. The UE transmits an RAT data switch command message to the IWE in order to notify the IWE that the uplink of the second RAT is deactivated (625). As the uplink of the second RAT is deactivated, the flow of the uplink data transmitted to the second RAT may be switched to the first RAT. The UE may notify the base station of the second RAT that the flow of the uplink data is switched.

The IWE transmits an RAT data switch response to the UE (630).

The UE transmits/receives uplink/downlink data to/from the first RAT (635) and receives only downlink data from the second RAT (640).

When event B occurs, the UE deactivates the uplink of the first RAT. The UE transmits an RAT data switch command message to the IWE in order to notify the IWE that the uplink of the first RAT is deactivated (645). As the uplink of the first RAT is deactivated, the flow of the uplink data transmitted to the first RAT may be switched to the second RAT. The UE may notify the base station of the first RAT that the flow of the uplink data is switched.

The IWE transmits an RAT data switch response to the UE (650).

The UE receives only downlink data from the first RAT (655) and transmits/receives uplink/downlink data to/from the second RAT (660). When the uplink deactivation termination message is received from the IWE of the first RAT, when a trigger condition is no longer satisfied, when a connection with a specific RAT is released or when transmission of last uplink data is completed, the UE terminates deactivation of the uplink.

Figure 7:
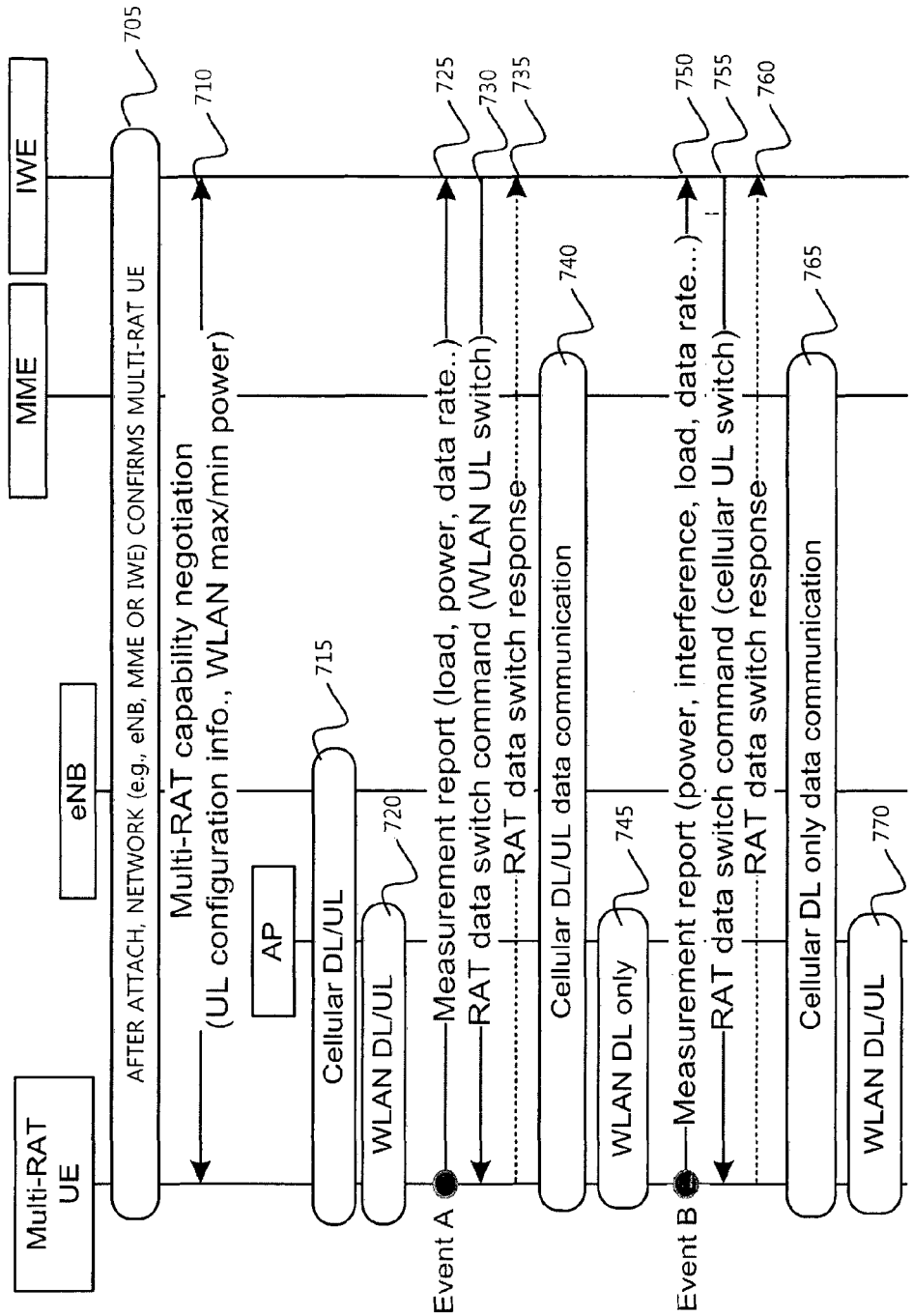

FIG. 7 is a diagram showing an uplink control method of a UE according to another embodiment of the present invention. The above description may be referred to for understanding of the embodiment of FIG. 7 and a repeated description of FIGS. 4, 5 and 6 will be omitted.

An entity of the first RAT, that is, an IWE, confirms that the UE is a multi-RAT UE (705). The UE and the IWE perform multi-RAT capability negotiation (710).

The UE transmits/receives uplink/downlink data to/from the base station (e.g., eNB) of the first RAT and the base station (e.g., AP) of the second RAT (715 and 720). The UE measures values corresponding to a trigger condition while transmitting/receiving uplink/downlink data to/from the base station of the first RAT and the base station of the second RAT. For example, the UE reports the measurement values such as load, power, data rate and interference of the uplink of the first RAT and the second RAT to the IWE (measurement report). The measurement report may be periodically performed. The measurement report may be performed when a trigger condition is satisfied.

For example, when event A occurs, the UE transmits the measurement report to the IWE (725). The IWE determines whether the uplink of the second RAT is deactivated with respect to the UE based on the measurement report. The IWE transmits a command for deactivating the uplink of the second RAT to the UE (730). The UE transmits an RAT data switch response to the IWE (735).

The UE deactivates the uplink of the second RAT. As the uplink of the second RAT is deactivated, the flow of the uplink data transmitted to the second RAT may be switched to the first RAT.

The UE transmits/receives uplink/downlink data to/from the first RAT (740) and receives only downlink data from the second RAT (745).

When event B occurs, the UE transmits the measurement report to the IWE (750). The IWE determines whether the uplink of the first RAT is deactivated with respect to the UE based on the measurement report. The IWE transmits a command for deactivating the uplink of the second RAT to the UE (755). The UE transmits an RAT data switch response to the IWE (760).

The UE deactivates the uplink of the first RAT. As the uplink of the first RAT is deactivated, the flow of the uplink data transmitted to the first RAT may be switched to the second RAT.

The UE receives only downlink from the first RAT (765) and transmits/receives uplink/downlink data to/from the second RAT (770).

Figure 8:
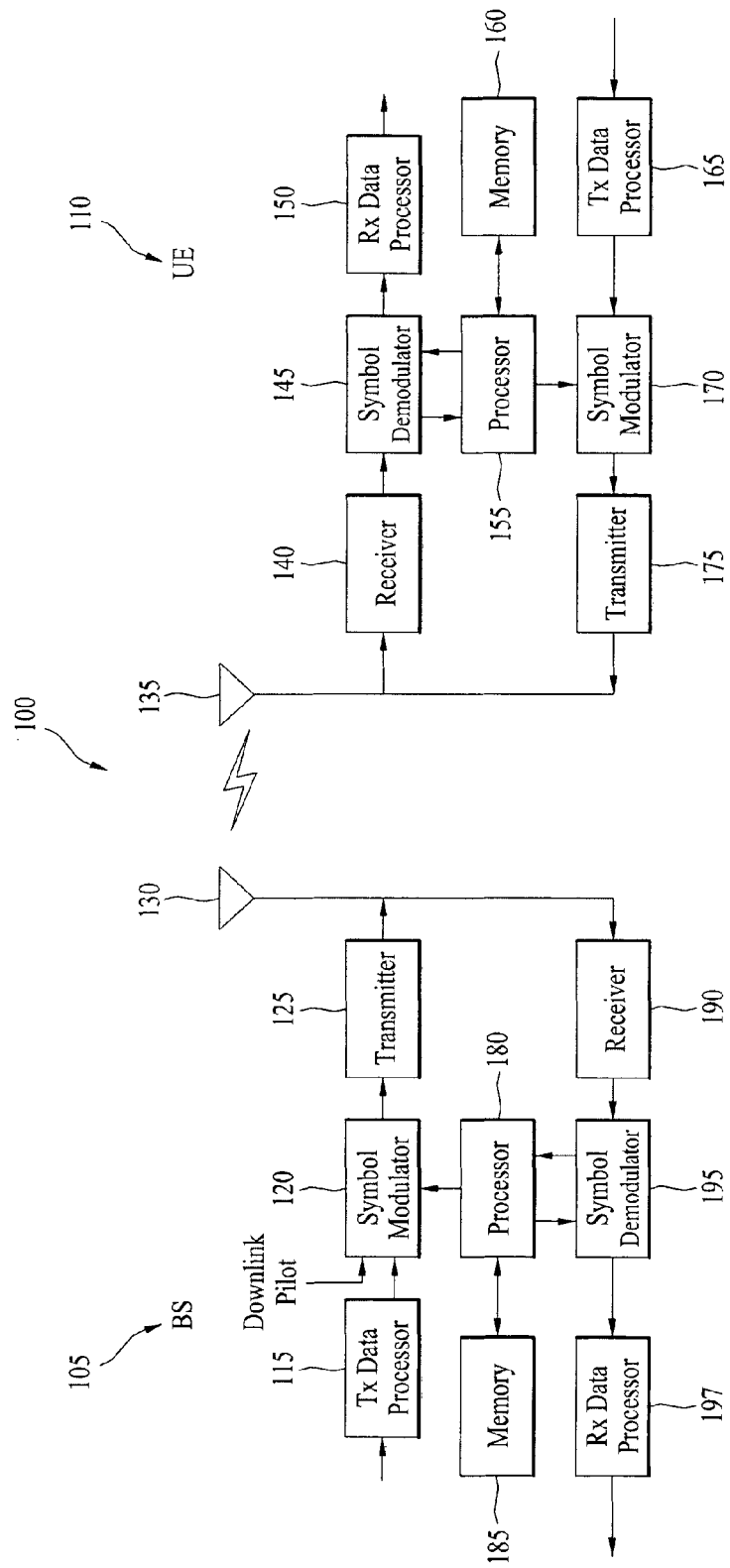
FIG. 8 is a diagram showing a UE and a base station according to one embodiment of the present invention.

FIG. 8 is a diagram showing a UE and a base station according to one embodiment of the present invention. The base station shown in FIG. 7 may be a base station of a first RAT and a base station (e.g., AP) of a second RAT. The RAT 100 may be the first RAT or the second RAT. Although one base station 105 and one UE 110 (including a D2D terminal) are shown in FIG. 8, the RAT 100 may include one or more base stations and/or one or more UEs.

Referring to FIG. 8, the base station 105 may include a transmission (Tx) data processor 115, a symbol modulator 120, a transmitter 125, a transmit/receive antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmit/receive antenna 135, a processor 155, a memory 160, a receiver 140, a symbol demodulator 155, and an Rx data processor 150. Although one antenna 130 and one antenna 135 are respectively included in the base station 105 and the UE 110, each of the base station 105 and the UE 110 includes a plurality of antennas. Accordingly, the base station 105 and the UE 110 according to the present invention support a Multiple Input Multiple Output (MIMO) system. The base station 105 and the UE 110 according to the present invention support both a Single User-MIMO (SU-MIMO) scheme and a Multi User-MIMO (MU-MIMO) scheme.

In downlink, the Tx data processor 115 receives traffic data, formats and codes the received traffic data, interleaves and modulates the coded traffic data (or performs symbol mapping), and provides modulated symbols ("data symbols"). The symbol modulator 120 receives and processes the data symbols and pilot symbols and provides a symbol stream.

The symbol modulator 120 multiplexes data and pilot signals and transmits the multiplexed data to the transmitter 125. At this time, the transmitted symbols may be data symbols, pilot symbols or zero signal values. In each symbol period, the pilot symbols may be consecutively transmitted. The pilot symbols may be Frequency Division Multiplexed (FDM), Orthogonal Frequency Division Multiplexed (OFDM), Time Division Multiplexed (TDM) or Code Division Multiplexed (CDM) symbols.

The transmitter 125 receives and converts the symbol stream into one or more analog signals, additionally adjusts (e.g., amplifies, filters, and frequency-up-converts) the analog signals, and generates a downlink signal suitable for transmission through a radio channel. Subsequently, the downlink signal is transmitted to the UE through the antenna 130.

In the UE 110, the receive antenna 135 receives the downlink signal from the eNB and provides the received signal to the receiver 140. The receiver 140 adjusts (e.g., filters, amplifies, frequency-down-converts) the received signal and digitizes the adjusted signal so as to acquire samples. The symbol demodulator 145 demodulates the received pilot symbols and provides the demodulated pilot symbols to the processor 155, for channel estimation.

The symbol demodulator 145 receives downlink frequency response estimation values from the processor 155, performs data demodulation with respect to the received data symbols, acquires data symbol estimation values (which are estimation values of the transmitted data symbols), and provides the data symbol estimation values to the Rx data processor 150. The Rx data processor 150 demodulates (that is, symbol-demaps and deinterleaves) the data symbol estimation values, decodes the demodulated values, and restores transmitted traffic data.

The processes performed by the symbol demodulator 145 and the Rx data processor 150 are complementary to the processes performed by the symbol modulator 120 and the Tx data processor 115 of the base station 105.

In the UE 110, in uplink, the Tx data processor 165 processes the traffic data and provides data symbols. The symbol modulator 170 receives the data symbols, multiplexes the data symbols, performs modulation with respect to the symbols and provides a symbol stream to the transmitter 175. The transmitter 175 receives and processes the symbol stream, generates an uplink signal, and transmits the uplink signal to the base station 105 through the transmit antenna 135.

The base station 105 receives the uplink signal from the UE 110 through the receive antenna 130 and the receiver 190 processes the received uplink signal and acquires samples. Subsequently, the symbol demodulator 195 processes the samples and provides pilot symbols received in the uplink and data symbol estimation values. The Rx data processor 197 processes the data symbol estimation values and restores traffic data transmitted from the UE 110.

The respective processors 155 and 180 of the UE 110 and the base station 105 instruct (e.g., control, adjust, manages, etc.) the respective operations of the UE 110 and the base station 105. The processors 155 and 180 may be connected to the memories 160 and 185 for storing program codes and data. The memories 160 and 185 may be respectively connected to the processors 155 and 180 so as to store operating systems, applications and general files.

Each of the processors 155 and 180 may also be referred to as a controller, a microcontroller, a microprocessor, a microcomputer, etc. The processors 155 and 180 may be implemented by hardware, firmware, software, or a combination thereof. If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 155 and 180.

If the embodiments of the present invention are implemented by firmware or software, the firmware or software may be configured to include modules, procedures, functions, etc. for performing the functions or operations of the present invention. The firmware or software configured to perform the present invention may be included in the processors 155 and 180 or may be stored in the memories 160 and 185 so as to be driven by the processors 155 and 180.

Layers of the radio interface protocol between the UE and the eNB in the wireless communication system (network) may be classified into a first layer (L1), a second layer (L2) and a third layer (L3) based on the three low-level layers of the well-known Open System Interconnection (OSI) model of a communication system. A physical layer belongs to the first layer and provides an information transport service through a physical channel. A Radio Resource Control (RRC) layer belongs to the third layer and provides control radio resources between the UE and the network. The UE and the eNB exchange RRC messages with each other through a wireless communication network and the RRC layer.

In the present specification, although the processor 155 of the UE and the processor 180 of the base station perform process signals and data except for a data transmission/reception function and a storage function of the UE 110 and the base station 105, for convenience of description, the processors 155 and 180 are not specially described. Although the processors 155 and 180 are not specially described, the processors 155 and 180 may perform a series of operations such as data processing except for a signal transmission/reception function and a storage function.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. More-over, it will be apparent that some claims referring to specific claims may be combined with other claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method for controlling uplink transmissions at a user equipment (UE) in a multi-radio access technology (multi-RAT) environment, the method comprising:
   transmitting uplink data for a first RAT and a second RAT to a base station of the first RAT and a base station of the second RAT;
   reporting information on UE transmit power for the first RAT and the second RAT according to the transmission of the uplink data, to an entity of the first RAT managing interworking between the first RAT and the second RAT;
   receiving a message including information for deactivating an uplink of one of the first and second RATs from the entity of the first RAT, when a sum of the UE transmit power for the first RAT and the UE transmit power for the second RAT exceeds first maximum transmit power; and
   selectively deactivating the uplink of the one of the first and second RATs based on the message received from the entity of the first RAT.

2. The method according to claim 1, further comprising transmitting information on second maximum transmit power allowed to the UE for the second RAT to the entity of the first RAT,
   wherein the first maximum transmit power is a maximum value of power for simultaneously transmitting to the first RAT and the second RAT and is determined using the information on the second maximum transmit power.

3. The method according to claim 1, wherein the selectively deactivating the uplink of the one of the first and second RATs includes sequentially deactivating the uplink of the first RAT and the uplink of the second RAT while downlinks of the first RAT and the second RAT are kept in an active state.

4. The method according to claim 1, wherein the message received from the entity of the first RAT includes at least one of a deactivation order of the respective uplinks of the first RAT and the second RAT, a deactivation cycle, a deactivation time of a specific RAT within the deactivation cycle, a start time of the deactivation cycle and an offset from the start time.

5. The method according to claim 1, wherein the reporting the information on the UE transmit power includes transmitting, to the entity of the first RAT, power headroom reporting (PHR) indicating a difference between the UE transmit power and the first maximum transmit power.

6. The method according to claim 1, further comprising terminating the selective deactivating of the uplink if a predetermined termination condition is satisfied, wherein the predetermined termination condition comprises at least one of reception of a termination message from the entity of the first RAT, release of a connection with a specific RAT and completion of transmission of last uplink data.

7. The method according to claim 1, wherein:
the first RAT is a cellular network,
the entity of the first RAT is an eNode B, a mobility management entity (MME) or an interworking management entity (IWME),
the second RAT is a wireless local area network (WLAN), and
the base station of the second RAT is an access point (AP) of the WLAN.

8. A method for controlling an uplink transmission of a user equipment (UE) at an entity managing interworking between multiple radio access technologies (RATs), the method comprising:
receiving information on UE transmit power related to transmission of uplink data to a first RAT and a second RAT; and
transmitting a message including information for deactivating an uplink of one of the first and second RATs, when a sum of the UE transmit power for the first RAT and the UE transmit power for the second RAT exceeds first maximum transmit power,
wherein the uplink of the one of the first and the second RATs is selectively deactivated based on the message.

9. The method according to claim 8, further comprising:
receiving information on second maximum transmit power allowed to the UE for the second RAT; and
determining the first maximum transmit power using the information on the second maximum transmit power,
wherein the first maximum transmit power is a maximum value of power for simultaneously transmitting to the first RAT and the second RAT.

10. The method according to claim 8, wherein the uplink of the first RAT and the uplink of the second RAT are sequentially deactivated while downlinks of the first RAT and the second RAT are kept in an active state.

11. The method according to claim 8, wherein the message includes at least one of a deactivation order of the respective uplinks of the first RAT and the second RAT, a deactivation cycle, a deactivation time of a specific RAT within the deactivation cycle, a start time of the deactivation cycle and an offset from the start time.

12. The method according to claim 8, wherein the information on the UE transmit power includes power headroom reporting (PHR) indicating a difference between the UE transmit power of and the first maximum transmit power.

13. The method according to claim 8, wherein:
the first RAT is a cellular network,
the second RAT is a wireless local area network (WLAN), and
the entity is an eNode B, a mobility management entity (MME) or an interworking management entity (IWME) in the cellular network.

* * * * *